(12) United States Patent
Kitayama et al.

(10) Patent No.: US 7,942,990 B2
(45) Date of Patent: May 17, 2011

(54) HYBRID INFLATOR

(75) Inventors: Kenji Kitayama, Hyogo (JP); Shogo Tomiyama, Hyogo (JP); Masayuki Nakayasu, Hyogo (JP)

(73) Assignee: Daicel Chemical Industries, Ltd., Osaka-Shi (JP)

( * ) Notice: Subject to any disclaimer, the term of this patent is extended or adjusted under 35 U.S.C. 154(b) by 437 days.

(21) Appl. No.: 12/000,775

(22) Filed: Dec. 17, 2007

(65) Prior Publication Data

US 2008/0142127 A1 Jun. 19, 2008

(30) Foreign Application Priority Data

Dec. 18, 2006 (JP) ................................. 2006-339541
Sep. 28, 2007 (JP) ................................. 2007-255224

(51) Int. Cl.
*C06B 45/00* (2006.01)
*C06B 29/00* (2006.01)
*C06B 29/02* (2006.01)
*C06B 29/16* (2006.01)
*D03D 23/00* (2006.01)
*D03D 43/00* (2006.01)

(52) U.S. Cl. .................. 149/75; 149/2; 149/77; 149/78; 149/109.4

(58) Field of Classification Search ..................... 149/75, 149/2, 77, 78, 109.4
See application file for complete search history.

(56) References Cited

U.S. PATENT DOCUMENTS

| | | | |
|---|---|---|---|
| 5,553,889 A | 9/1996 | Hamilton et al. | |
| 5,602,361 A | 2/1997 | Hamilton et al. | |
| 5,725,699 A | 3/1998 | Hinshaw et al. | |
| 5,913,537 A | 6/1999 | Goetz | |
| 6,142,518 A | 11/2000 | Butt et al. | |
| 6,623,574 B1 | 9/2003 | Wu | |
| 6,793,244 B1 | 9/2004 | Katsuda et al. | |
| 2001/0020504 A1* | 9/2001 | Knowlton et al. | ............. 149/36 |
| 2003/0151241 A1 | 8/2003 | Matsuda et al. | |
| 2006/0162607 A1* | 7/2006 | Kodama et al. | ............... 102/530 |

FOREIGN PATENT DOCUMENTS

| | | |
|---|---|---|
| JP | 11-286254 A | 10/1999 |
| JP | 2000-103691 A | 4/2000 |
| JP | 2001-526148 A | 12/2001 |
| JP | 2003-226222 A | 8/2003 |
| JP | 2003-524565 A | 8/2003 |
| JP | 2006-524565 A | 11/2006 |
| WO | WO-96/27574 A1 | 9/1996 |
| WO | WO-99/05079 A1 | 4/1999 |
| WO | WO-99/32334 A1 | 7/1999 |
| WO | WO-2004/096405 A1 | 11/2004 |

* cited by examiner

*Primary Examiner* — James E McDonough
(74) *Attorney, Agent, or Firm* — Birch, Stewart, Kolasch & Birch, LLP

(57) ABSTRACT

The present invention provides a hybrid inflator including:
a pressurized gas and a solid gas generating agent that generates a combustion gas as a gas source,
the solid gas generating agent including at least an oxidizing agent and a binder, the pressurized gas including 15 mol % or more of oxygen.

13 Claims, 1 Drawing Sheet

HYBRID INFLATOR

Figure 1:
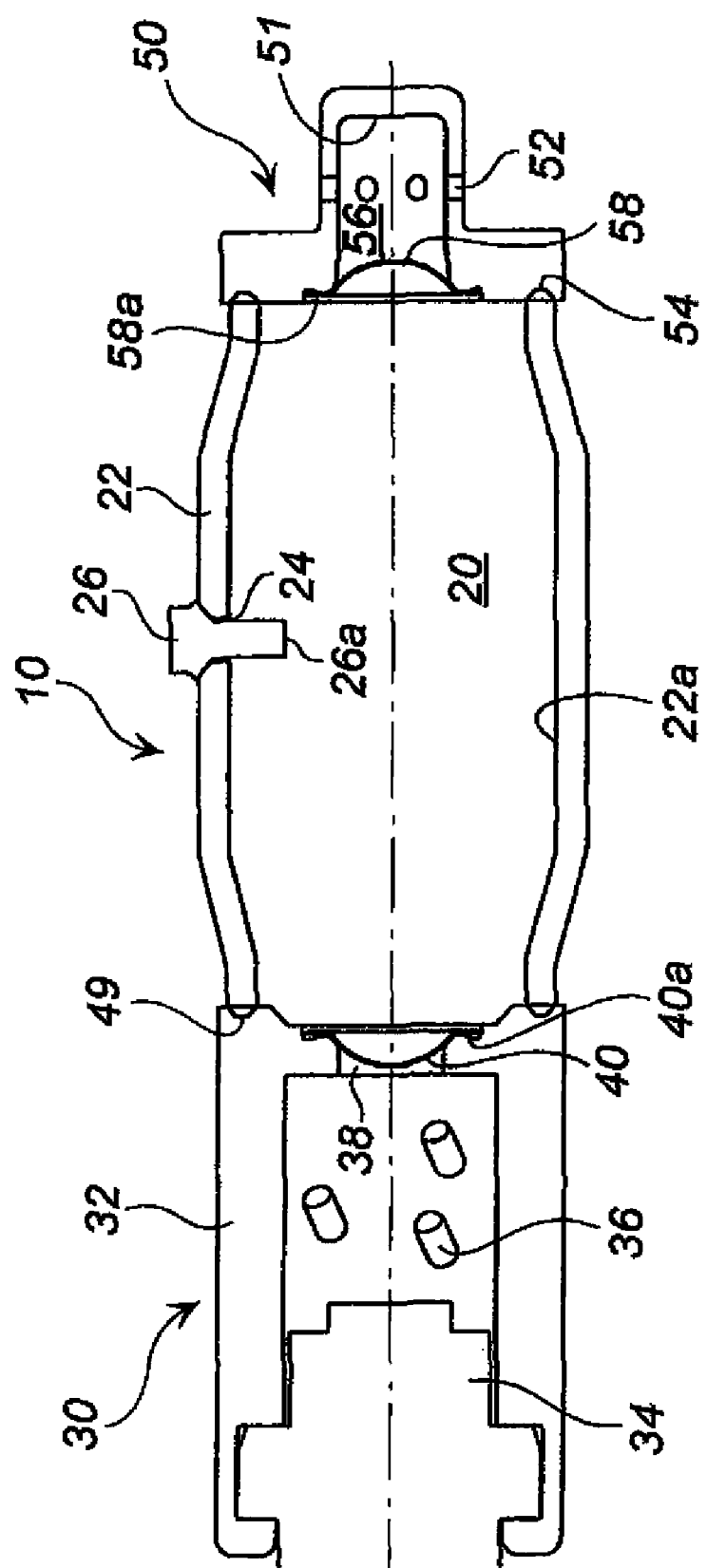

This nonprovisional application claims priority under 35 U.S.C. §119(a) on Patent Applications No. 2006-339541 filed in Japan on 18 Dec. 2006 and No. 2007-255224 filed in Japan on 28 Sep. 2007, which are incorporated by reference.

BACKGROUND OF INVENTION

1. Field of Invention

The present invention relates to a hybrid inflator used for an airbag system of an automobile.

2. Description of Related Art

A solid gas generating agent is used together with a pressurized gas as a gas generation source for a hybrid inflator, and the gas heat generated by combustion of the solid gas generating agent is used to compensate the drop in temperature caused by heat absorption induced by rapid expansion of the pressurized gas flowing out of the inflator.

On the other hand, when an inflator is installed at a vehicle, from the standpoint of saving space and eliminating design restrictions, it is preferred that the inflator be as small as possible, and the demand for size reduction is very strong. Please see JP-A No. 2003-226222, JP-A No. 11-286254, JP-A No. 2001-526148, U.S. Pat. Nos. 5,602,361, 5,913,537.

SUMMARY OF INVENTION

The present invention provides a hybrid inflator including:

a pressurized gas and a solid gas generating agent that generates a combustion gas as a gas source, the solid gas generating agent including at least an oxidizing agent and a binder, the pressurized gas including 15 mol % or more of oxygen.

The present invention also provides a hybrid inflator including:

a pressurized gas and a solid gas generating agent that generates a combustion gas as a gas source, the solid gas generating agent including at least a fuel, an oxidizing agent and a binder, a mass ratio (fuel/oxidizing agent) of the fuel to the oxidizing agent being within a range of from more than 0.35 to less than 0.95, the pressurized gas including 15 mol % or more of oxygen.

BRIEF DESCRIPTION OF INVENTION

The present invention will become more fully understood from the detailed description given hereinbelow and the accompanying drawings which are given by way of illustration only, and thus are not limitative of the present invention and wherein:

FIG. 1 shows a cross-sectional view in the axial direction of the hybrid inflator in accordance with the present invention.

DETAILED DESCRIPTION OF INVENTION

The present invention provides a hybrid inflator that can be reduced in size as a whole by decreasing the amount of a solid gas generating agent, while maintaining the basic performance characteristics (burning rate, ignition ability, amount of generated heat) required for a solid gas generating agent in a hybrid inflator.

The present invention further provides a hybrid inflator that has good ignition ability at a low temperature and in which stable ignition ability can be obtained regardless of variations in ambient temperature.

In the hybrid inflator in accordance with the present invention, at least an oxidizing agent and a binder are included, and a fuel can be used if necessary. When a fuel is not included as the solid gas generating agent, basic performance characteristics (burning rate, ignition ability, amount of generated heat) required for the solid gas generating agent can be maintained by the binder functioning as a fuel.

In the hybrid inflator in accordance with the present invention, the amount of oxidizing agent used can be reduced, while maintaining basic performance characteristics (burning rate, ignition ability, amount of generated heat) required for the solid gas generating agent, when a gas including 15 mol % or more of oxygen is used as the pressurized gas and the oxygen is caused to function as the oxidizing agent.

Therefore, in the hybrid inflator in accordance with the present invention, the total amount of the solid gas generating agent used is reduced, thereby making it possible to reduce the space necessary to load the solid gas generating agent and miniaturize the entire hybrid inflator.

It is preferred that the solid gas generating agent include nitroguanidine as the fuel and a perchlorate as the oxidizing agent, and the mass ratio (fuel/oxidizing agent) of the nitroguanidine to the perchlorate be within a range of from more than 0.35 to less than 0.95.

By setting the compounding mass ratio of the fuel and oxidizing agent within the aforementioned range, it is possible to improve ignition ability of the solid gas generating agent at a low temperature and also inhibit the variation in ignition ability at an ambient temperature within a wide range (from winter to summer).

It is preferred that the solid gas generating agent include carboxymethyl cellulose or a salt thereof as the binder, and the content ratio of the carboxymethyl cellulose or a salt thereof be 30 mass % or more.

Because the hybrid inflator in accordance with the present invention uses a binder as a fuel, the content ratio of the binder is increased, but even when a fuel is used, the content ratio thereof can be reduced. Further, by using a large amount of the binder, it is possible to maintain the amount of generated heat that is required for a gas generating agent.

In the hybrid inflator in accordance with the present invention, a binder is used as a fuel, oxygen in an amount equal to or higher than the predetermined amount is included into the pressurized gas, and the oxygen is used as an oxidizing agent, whereby the amounts of fuel and oxidizing agent that are used can be reduced. Therefore, the volume required for loading the solid gas generating agent can be reduced, thereby making it possible to reduce the size of the entire inflator.

Further, in the hybrid inflator in accordance with the present invention, the compounding mass ratio of the fuel and the oxidizing agent is set within the predetermined range. As a result, the ignition ability of the solid gas generating agent, in particular, at a low temperature, can be improved, the variation of ignition ability in a wide range of ambient temperatures (form winter to summer) can be inhibited, and stable ignition ability can be obtained.

The present invention relates to a hybrid inflator suitable for an airbag system of an automobile.

EMBODIMENTS OF THE INVENTION

In the hybrid inflator in accordance with the present invention, the structure itself, without the gas source, is identical to the known ones. For example, the structure shown in FIGS. 1 to 12 of JP-A No. 2003-226222 can be used.

In the hybrid inflator in accordance with the present invention, an oxidizing agent and a binder are included as a solid gas generating agent and, if necessary, a fuel can be included.

A known oxidizing agent described in JP-A No. 2003-226222, or the like, can be used as the oxidizing agent, but a perchlorate such as ammonium perchlorate, sodium perchlorate, and potassium perchlorate is preferred.

A known binder described in JP-A No. 2003-226222, U.S. Pat. No. 5,725,699, JP-A No. 2000-103691, JP-A No. 2003-524565, and WO-A No. 96/27574 can be used as the binder.

The binders selected from those listed below can be used individually or, if necessary, in combinations.

Methyl cellulose, ethyl cellulose, hydroxyethyl cellulose, hydroxypropyl cellulose, carboxymethyl cellulose sodium salt, cellulose acetate butyrate, nitrocellulose, microcrystalline cellulose, α-cellulose;

dextrin, gum arabic, gum tragacanth, carrageenan, sodium alginate, gelatin, starch, guar gum, gluten;

poly-N-vinyl pyrrolidone, polyvinyl alcohol, polyvinyl acetate;

polypropylene carbonate, polyethylene glycol, polyamides (Nylon and the like), poly-acrylic polymers (polyacrylamides, sodium polyacrylate, and the like), polyacetals, urea resins, melamine resins, polyurethanes, thermoplastic rubbers;

sugars such as sucrose, glucose sugar or sorbitol sugar;

magnesium borate, magnesium silicate;

lactose, mannitol, amylose;

calcium phosphate, calcium lactate, magnesium alminate metasilicate.

A known fuel, described in JP-A No. 2003-226222, and the like, can be used as the fuel. The fuel is preferably selected from guanidine derivatives such as nitroguanidine (NQ), guanidine nitrate (GN), guanidine carbonate, aminonitroguanidine, aminoguanidine nitrate, aminoguanidine carbonate, diaminoguanidine nitrate, diaminoguanidine carbonate or triaminoguanidine nitrate. Nitroguanidine is more preferred.

When the solid gas generating agent is a two-component system including the oxidizing agent and the binder or a three-component system additionally containing the fuel, the content of the binder is preferably 20 to 90 mass %, more preferably 30 to 80 mass %, and even more preferably 40 to 70 mass %.

The content of the oxidizing agent is the remaining amount in the case of the two-component system. In the case of the three-component system, the content of the oxidizing agent is preferably 5 to 60 mass %, more preferably 10 to 50 mass %, and even more preferably 20 to 40 mass %.

The content of the fuel is preferably 60 mass % or less, more preferably 50 mass % or less, even more preferably 5 to 40 mass %.

When the fuel and the oxidizing agent are used as the solid gas generating agent, the mass ratio (fuel/oxidizing agent) of the fuel to the oxidizing agent is preferably within a range of from more than 0.35 to less than 0.95, more preferably within a range of 0.4 to 0.8. When the mass ratio is within this range, the ignition ability of the gas generating agent at a low temperature can be improved and the variation in ignition ability caused by changes in the ambient temperature can be reduced.

It is preferred that in the solid gas generating agent, nitroguanidine be used as the fuel, a perchlorate as the oxidizing agent, and carboxymethyl cellulose or a salt thereof as the binder.

The mass ratio (nitroguanidine/perchlorate) of the nitroguanidine to the perchlorate is preferably more than 0.35 to less than 0.95, more preferably 0.4 to 0.8. When the mass ratio is within this range, the ignition ability of the gas generating agent at a low temperature can be improved and the variation in ignition ability caused by changes in the ambient temperature can be reduced.

The carboxymethyl cellulose or a salt thereof that is used as the binder is preferably contained in an amount of 30 mass % or more to ensure a sufficient amount of generated gas.

If necessary, known additives described in JP-A No. 2003-226222 or the like can be compounded with the solid gas generating agent.

The solid gas generating agent can be manufactured by adding water or an organic solvent to gas generating agent components, mixing, and extrusion-molding (single-perforated cylindrical molded body or perforated (porous) cylindrical molded body) or by compression-molding by using a palletizer or the like (pellet-shape molded body).

In the hybrid inflator in accordance with the present invention, a gas including oxygen at 15 mol % or more is used as a pressurized gas. The content of the oxygen is preferably 15 to 50 mol %, more preferably 15 to 25 mol %.

The filling pressure of the pressurized gas is preferably 10,000 to 70,000 kPa, more preferably 30,000 to 60,000 kPa.

An embodiment of the hybrid inflator in accordance with the present invention will be described below with reference to FIG. 1. FIG. 1 a cross sectional view in the axial direction of a hybrid inflator 10, and this hybrid inflator is identical to the hybrid inflator 10 shown in FIG. 3 of JP-A No. 2003-226222, from which a cap 44 has been removed.

The inflator 10 has a pressurized gas chamber 20, a gas generator 30, and a diffuser portion 50.

In the pressurized gas chamber 20, an outer shell is formed by a cylindrical pressurized gas chamber housing 22, and this outer shell is filled with a pressurized gas including a mixture of argon and helium. The pressurized gas chamber housing 22 has a shape symmetrical in the axial direction and radial direction. Therefore, no alignment in the axial direction and radial direction is necessary during assembling.

A charging hole 24 for the pressurized gas is formed in the side surface of the pressurized gas chamber housing 22, and this hole is closed by a pin 26 after the pressurized gas has been charged. A distal end portion 26a of the pin 26 protrudes into the pressurized gas chamber 20, and the protruding portion has a length such that enables collision with the combustion gas flow of the gas generating agent. By adjusting the length of the protruding portion of the pin 26, it is possible to induce collision of the combustion gas with the pin 26 itself, thereby causing the adhesion of combustion residues thereon.

The gas generator 30 includes an ignition means (electric igniter) 34 and a solid gas generating agent 36 accommodated within a gas generator housing 32; the gas generator is connected to one end side of the pressurized gas chamber 20. The gas generator housing 32 and the pressurized gas chamber housing 22 are resistance-welded in the joint portion 49. When the inflator 10 is incorporated in an airbag system, the ignition means 34 is connected via a connector and a conductor wire to an external power source.

The solid gas generating agent 36 includes 10 to 35 mass % of nitroguanidine as a fuel, 10 to 50 mass % of potassium perchlorate as an oxidizing agent, and 30 to 80 mass % of carboxymethyl cellulose sodium salt as a binder, with the nitroguanidine/potassium perchlorate mass ratio being more than 0.35 and less than 0.95.

A first communication hole 38 located between the pressurized gas chamber 20 and the gas generator 30 is closed by a bowl-shaped first rupturable plate 40, and the inside of the gas generator 30 is maintained under an ambient pressure. The first rupturable plate 40 is resistance-welded to the gas generator housing 32 in the circumferential edge portion 40a.

A diffuser portion 50 having a gas discharge port 52 for discharging the pressurized gas and combustion gas is connected to the other end side of the pressurized gas chamber 20.

The diffuser portion 50 and the pressurized gas chamber housing 22 are resistance-welded in a joint portion 54.

The diffuser portion 50 has a cap-like shape having a plurality of gas discharge ports 52 for passing the gas therethrough. The diameter of a plurality of gas discharge ports 52 is preferably 0.5 to 2 mm, more preferably 0.5 to 1.2 mm. The total opening area of a plurality of gas discharge ports 52 is preferably 20 to 1000 mm$^2$, more preferably 100 to 500 mm$^2$.

A second communication hole 56 located between the pressurized gas chamber 20 and the diffuser portion 50 is closed by a second rupturable plate 58, and the inside of the diffuser portion 50 is maintained under an ambient pressure. The second rupturable plate 58 is resistance-welded to the diffuser portion 50 in a circumferential edge portion 58a.

(2) Pmax (kPa)

The inflator in accordance with the present invention, shown in FIG. 3 of JP-A No. 2003-226222, was fixed inside a stainless steel tank having an inner capacity of 60 L or 28.3 L, the tank was sealed at room temperature, and then the inflator was connected to an external ignition electric circuit. Separately, the pressure rise variation inside the tank was measured within an interval of 0 to 200 msec, where the point in time in which the ignition circuit switch was turned on was taken as 0, with a pressure transducer disposed in the tank. The performance of the hybrid inflator was evaluated by eventually representing the measured data as a "tank pressure vs time curve" by computer processing. The maximum value of the curve was taken as a maximum pressure (Pmax).

TABLE 1

| | Composition of solid gas generating agent(mass %) | | | | | Composition of pressurized gas (mol %) | | Heat of combustion | Pmax |
|---|---|---|---|---|---|---|---|---|---|
| | | | | | Japanese acid clay | | | | |
| | NQ | KClO$_4$ | Sr(NO$_3$)$_2$ | CMCNa | Amount used(g) | He | O$_2$ | (cal/g) | (kPa) |
| Comparative Example 1 | 33.80 | — | 55.20 | 10.00 | 1.00 | 10.0 | 100 | 0 | 737 | 360 |
| Example 1 | 40.00 | 10.00 | — | 50.00 | — | 2.8 | 80 | 20 | 2543 | 374 |
| Example 2 | 15.00 | 20.00 | — | 65.00 | — | 2.8 | 80 | 20 | 2570 | 373 |
| Example 3 | 5.00 | 30.00 | — | 65.00 | — | 2.8 | 80 | 20 | 2370 | 400 |

The inflator 10 shown in FIG. 1 uses the solid gas generating agent 36 of the above-described composition in which the mass ratio of nitroguanidine/potassium perchlorate is more than 0.35 and less than 0.95. Therefore, the inflator has excellent ignition ability and the generation of combustion residue is inhibited. As a result, a cap 44 for trapping the combustion residue, such as in the hybrid inflator 10 shown in FIG. 3 of JP-A No. 2003-226222 becomes unnecessary. Further, as described above, because the generation of combustion residue is inhibited, the action of trapping the combustion residue in the pin 26 and diffuser portion 50 is not important for the same reason for which the cap 44 is not required.

The hybrid inflator in accordance with the present invention can be applied to a variety of inflators such as an airbag inflator for a driver side and an airbag inflator for a passenger side next to the driver.

EXAMPLES

Examples 1 to 3 and Comparative Example 1

A total of 1000 g of solid gas generating agent components of the composition shown in Table 1 were twice passed through a sieve having a 500 μm mesh, mixed together, and charged into a kneader. Then, 500 g of ion-exchange water was added and mixing was performed for 180 minutes at 40° C. The mixture obtained was extruded with an extruder, cut, and dried to obtain a disk-shaped solid gas generating agent having an outer diameter of 1.45 mm and a thickness of 1.43 mm.

In the present embodiment, helium and oxygen were used as the pressurized gas, whereas only helium was used in Comparative Example. The below-described tests were carried out with respect to such combination of the solid gas generating agent and pressurized gas. The results are shown in Table 1.

(1) Heat of Combustion (cal/g)

The heat of combustion was measured with an YM Nenken-type digital calorimeter 1013S-2 manufactured by YOSHIDA SAKUSEISHO CO., LTD.

With the hybrid inflator in accordance with the present invention, the heat of combustion sufficient to operate the hybrid inflator can be obtained even when the content ratio of fuel in the solid gas generating agent is reduced. Therefore, the total amount of the solid gas generating agent that is used can be reduced.

Example 4, Comparative Examples 2 to 4

A total of 1000 g of solid gas generating agent components of the composition shown in Table 2 were twice passed through a sieve having a 500 μm mesh, mixed together, and charged into a kneader. Then, 500 g of ion-exchange water was added and mixing was performed for 180 minutes at 40° C. The mixture obtained was extruded with an extruder, cut, and dried to obtain a disk-shaped solid gas generating agent having an outer diameter of 1.45 mm and a thickness of 1.43 mm. A mixture gas (He: O$_2$=80 mol %:20 mol %) identical to that of Embodiments 1 to 3 was used as the pressurized gas. The below-described tests were carried out with respect to such combination of the solid gas generating agent and pressurized gas. The results are shown in Table 2.

(1) Heat of Combustion, Molar Number of Generated Gas

The heat of combustion was measured in the same manner as in Embodiments 1 to 3. The molar number of the generated gas is a calculated value.

(2) Methods for Measuring TTFG (Abbreviation of Time To First Gas: Time from Ignition to Start of Gas Generation) and P10 (Pressure Inside the Tank in 10 msec after the Actuation)

The hybrid inflator was fixed inside a 60 L tank. The tank was sealed, an ignition signal was sent, and the hybrid inflator was actuated. The pressure inside the tank was detected with a pressure sensor disposed inside the tank, the point in time (msec) at which a pressure equal to or higher than 2 kPa was detected was taken as TTFG and data on the pressure inside the tank in 10 msec after the actuation was detected. Data detected with the pressure sensor were sent the amplifier and amplified. The amplified data were transferred to a personal computer (PC) and converted into digital data by A/D conversion in the PC. The result was taken as P10 (kPa).

TABLE 2

| | NQ (mass %) | KClO$_4$ (mass %) | CMCNa (mass %) | NQ/KClO$_4$ | Heat of combustion (cal/g) | Molar number of generated gas (mol/100 g) | TTFG(ms) | | | P10(kPa) | | |
|---|---|---|---|---|---|---|---|---|---|---|---|---|
| | | | | | | | −40° C. | 23° C. | 80° C. | −40° C. | 23° C. | 80° C. |
| Comparative Example 2 | 5.00 | 30.00 | 65.00 | 0.17 | 2370 | 2.14 | 3.9 | 3.2 | 2.5 | 102.96 | 126.17 | 157.09 |
| Comparative Example 3 | 10.00 | 30.00 | 60.00 | 0.33 | 2296 | 2.21 | 11.8 | 3.5 | 2.9 | 0.00 | 128.45 | 162.14 |
| Example 4 | 20.00 | 30.00 | 50.00 | 0.67 | 2148 | 2.44 | 3.4 | 2.9 | 2.8 | 123.07 | 156.95 | 182.19 |
| Comparative Example 4 | 20.00 | 20.00 | 60.00 | 1.00 | 2495 | 2.45 | no ignition | 7.4 | 4.4 | no ignition | 53.86 | 115.10 |

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A hybrid inflator comprising:
    a pressurized gas and a solid gas generating agent that generates a combustion gas as a gas source,
    the solid gas generating agent comprising at least a nitroguanidine as the fuel, a perchlorate as an oxidizing agent and not less than 50% of a binder,
    the mass ratio (fuel/oxidizing agent) of the fuel to the oxidizing agent being within a range of 0.75 to less than 0.95,
    the pressurized gas comprising 15 mol % or more of oxygen.

2. The hybrid inflator according to claim 1, wherein the solid gas generating agent comprises potassium perchlorate as the oxidizing agent and wherein the mass ratio (fuel/oxidizing agent) of the nitroguanidine and the perchlorate is within a range of 0.75 to less than 0.95.

3. The hybrid inflator according to claim 1, wherein the hybrid inflator is suitable for use as an airbag system of an automobile.

4. The hybrid inflator according to claim 1, wherein the oxidizing agent is a perchlorate selected from the group consisting of ammonium perchlorate, sodium perchlorate and potassium perchlorate.

5. The hybrid inflator according to claim 1, wherein the binder is selected from the group consisting of:
    methyl cellulose, ethyl cellulose, hydroxyethyl cellulose, hydroxypropyl cellulose, carboxymethyl cellulose sodium salt, cellulose acetate butyrate, nitrocellulose, microcrystalline cellulose, α-cellulose;
    dextrin, gum arabic, gum tragacanth, carrageenan, sodium alginate, gelatin, starch, guar gum, gluten;
    poly-N-vinyl pyrrolidone, polyvinyl alcohol, polyvinyl acetate;
    polypropylene carbonate, polyethylene glycol, polyamides, poly-acrylic polymers, polyacetals, urea resins, melamine resins, polyurethanes, thermoplastic rubbers;
    sucrose, glucose sugar, sorbitol sugar;
    magnesium borate, magnesium silicate;
    lactose, mannitol, amylose;
    calcium phosphate, calcium lactate, and magnesium aluminate metasilicate.

6. The hybrid inflator according to claim 1, wherein the fuel is selected from the group consisting of nitroguanidine (NQ), guanidine nitrate (GN), guanidine carbonate, aminonitroguanidine, aminoguanidine nitrate, aminoguanidine carbonate, diaminoguanidine nitrate, diaminoguanidine carbonate and triaminoguanidine nitrate.

7. The hybrid inflator according to claim 1, wherein the content of oxidizing agent is 5 to 60 mass %.

8. The hybrid inflator according to claim 1, wherein the content of oxidizing agent is 10 to 50 mass %.

9. The hybrid inflator according to claim 1, wherein the content of oxidizing agent is 20 to 40 mass %.

10. The hybrid inflator according to claim 1, wherein the content of fuel is 60 mass % or less.

11. The hybrid inflator according to claim 1, wherein the content of fuel is 50 mass % or less.

12. The hybrid inflator according to claim 1, wherein the content of fuel is 5 to 40 mass %.

13. The hybrid inflator according to claim 1, wherein the hybrid inflator consists essentially of a pressurized gas and a solid gas generating agent that generates a combustion gas as a gas source,
    the solid gas generating agent comprising at least nitroguanidine as the fuel, potassium perchlorate as an oxidizing agent and not less than 50% of a binder,
    the mass ratio (fuel/oxidizing agent) of the fuel to the oxidizing agent being within a range of 0.75 to less than 0.95,
    the pressurized gas comprising 15 mol % or more of oxygen.

* * * * *